United States Patent
Stevens et al.

(10) Patent No.: US 7,834,774 B2
(45) Date of Patent: Nov. 16, 2010

(54) MONITORING OF CRITICAL DAIRY FARM CONDITIONS

(75) Inventors: Hilco Stevens, Drayton (CA); John A. Stevens, Drayton (CA); Jack B. Bosman, Conestogo (CA); Larry J. Wood, Waterloo (CA)

(73) Assignee: Dairy Cheq Inc., Waterloo (CA)

( * ) Notice: Subject to any disclaimer, the term of this patent is extended or adjusted under 35 U.S.C. 154(b) by 0 days.

(21) Appl. No.: 11/534,795

(22) Filed: Sep. 25, 2006

(65) Prior Publication Data

US 2007/0017448 A1 Jan. 25, 2007

(51) Int. Cl.
G08B 21/00 (2006.01)

(52) U.S. Cl. .................. 340/635; 340/310.16; 340/606; 340/584; 134/57 R; 134/58 R; 134/115 R; 134/169 C; 134/166 C; 119/14.18

(58) Field of Classification Search ............ 340/310.01, 340/603, 606, 607, 585, 584, 588; 134/57 R, 134/58 R, 115 R, 169 C, 166 C, 100.1; 119/14.18
See application file for complete search history.

(56) References Cited

U.S. PATENT DOCUMENTS

| | | | |
|---|---|---|---|
| 4,455,483 A | 6/1984 | Schönhuber | |
| 4,612,537 A | 9/1986 | Maltais et al. | |
| 4,710,755 A | 12/1987 | Gurney | |
| 5,272,997 A * | 12/1993 | van der Lely et al. | 119/14.08 |
| 5,400,246 A * | 3/1995 | Wilson et al. | 700/17 |
| 5,743,209 A | 4/1998 | Bazin et al. | |
| 5,996,529 A | 12/1999 | Sissom et al. | |
| 6,006,615 A | 12/1999 | Uttinger | |
| 6,056,829 A | 5/2000 | Versteijnen | |
| 6,089,242 A * | 7/2000 | Buck | 134/57 R |
| 6,136,362 A | 10/2000 | Ashton | |

OTHER PUBLICATIONS

Canadian Intellectual Property Office, Office Action for Canadian Patent Application. No. 2,417,398, Oct. 13, 2009.
Canadian Intellectual Property Office, Office Action for Canadian Patent App. No. 2,417,398, May 28, 2010.

* cited by examiner

*Primary Examiner*—Daryl Pope
(74) *Attorney, Agent, or Firm*—Borden Ladner Gervais LLP; Jeffrey W. Wong

(57) ABSTRACT

A system is provided herein for monitoring the quality of milk which is stored at a dairy facility comprising sensors, e.g., analog and/or digital sensors that are installed on equipment on a dairy farm. Such sensors report information through a communication device that sends the information, e.g., over wire-line or wireless telephony to a network operations center. The network operation center includes resident software which is programmed to interpret that information. Then, the software firstly determines whether the dairy farm operator needs to receive an alert or informational message via telephone or any other electronic communications device suggesting that the operator take appropriate action. Secondly, if necessary, the software then presents the alert and sensor information on a customized secure web site that the operator can access to review the information and prepare the compliance reporting for, e.g., HACCP-type activities.

12 Claims, 2 Drawing Sheets

MONITORING OF CRITICAL DAIRY FARM CONDITIONS

This application claims benefit of priority from U.S. Provisional Application No. 60/352,211, filed Jan. 29, 2002.

(1) BACKGROUND OF THE INVENTION (a) Field of the Invention

The present invention generally relates to the monitoring of the quality of the raw-milk which is produced and stored on dairy farms, and includes both systems and methods which are concerned herewith.

(b) Background Art

Raw milk from cows which is harvested with "milking" equipment on dairy farms is generally transferred via a network of piping, pumps, filters and possible heat exchangers into one or more storage tanks which are located on the dairy farm. Such harvesting sessions usually occur several times daily. The raw milk which has been transferred into the storage tank should be cooled to a predefined industry standard temperature for raw milk storage, within an industry specified time frame, as specified by certain regulatory bodies. Generally, raw milk is stored at temperatures no higher than 38° F. (3° C.) to ensure that small amounts of bacteria already existing in raw milk does not proliferate and degrade the quality of milk prior to transport to a processing plant.

The storage tanks on the dairy farm generally consist of a double-walled, insulated, stainless steel vessel. Some storage tanks may have an evaporator plate fixed to the outside of the inner stainless steel wall of the storage tank, through which a refrigerant is circulated as the means to remove the heat from the raw milk which is stored in the tank. Milk storage tanks without fixed cooling apparatus are also common, in which case the milk is cooled to the storage temperature for raw milk prior to entry into the storage tank.

The storage tank is charged with raw milk from one of any number of daily milking sessions, depending on the size of the cow herd and the number of times each cow is milked per day. At regular intervals (typically but not limited to once every 2 days) the raw milk is transferred to a milk transport truck for transport to a processing plant. Once empty, the storage tank is washed, sanitized and rinsed in preparation for subsequent storage of the next milking sessions. Typically this "clean-in-place" (CIP) procedure automatically circulates, first, a clear water rinse followed by detergent solution (usually alkaline) during which the cleaning solution must maintain a temperature above a specified threshold (determined by the blend of cleaning chemicals) for a specified minimum period of time, generally a minimum of 110° F. (38° C.) for no less than 4 to 9 minutes. Following the detergent cleaning cycle, an acid solution is circulated. In some cases, a final cold or tepid water rinse is used.

Occasionally operational errors of various kinds can occur during the cleaning cycle. It is not uncommon for the detergent cleaning solution to fall below the minimum temperature threshold and thereby to compromise the cleaning process. In other cases, various automatic mechanical cleaning equipment may malfunction, thereby compromising the cleaning cycle in various ways. Human error is also frequently a factor for failed cleaning processes.

Some time after the "clean-in-place" procedure has been completed (with or without mechanical or human failure), the dairy farmer or herdsman (the "operator"), would normally commence the next milk harvesting session during which raw milk will once again be transferred from the collection equipment to the storage tank. Typically, milk harvesting and cooling/storage equipment require some degree of manual operation, varying with location. Typically, operators are required to energize the milk harvesting and the cooling equipment circuits. Timing of procedures varies both within, and by location, and also by equipment configuration and brands. Freshly harvested raw milk from this first session must now be cooled within given allowable time periods. When the storage tank/condensing unit circuit is energized, the milk begins to cool to the required storage temperature. Typically, once the cooling circuit is energized, a control thermostat will "call" for cooling, causing the condensing unit to operate, thereby circulating liquid refrigerant though heat exchangers. Refrigerant "boiling off" in the heat exchangers will draw the heat from the warm milk. On some farms, milk may be partially or fully cooled prior to transfer into the storage tank, using various models of heat exchangers. After a variable amount of time, a milk harvesting session will finish. Typically, the cooling cycle will continue past the completion of the milking session until the temperature inside the storage tank is at the required level and the control thermostat automatically de-energizes the condensing unit.

At any time after the first session and before the next session, the control thermostat may call for cooling if the temperature of the raw milk rises above the recommended storage temperature. The control thermostat will continue to control the cooling process until the storage tank is again emptied at which time the cooling circuit will be energized.

At the start of a second milking session, the procedure begins in the same manner as the above-described first milking session. The operator starts the milk harvesting equipment. In many cases, new warm raw milk from the second milking session is collected for storage, and is diluted with the cooled milk from previous session or sensors, creating a blended temperature. The condensing unit circuit will be energized when the temperature inside the storage tank rises above the control thermostat set point. Sometime after the second milking session is over, blended milk will be cooled to the storage temperature and the thermostat will de-energize the condensing unit circuit.

Subsequent sessions will be completed until the stored raw milk is collected for transport to the processing plant. Immediately after the tank is emptied, a cleaning cycle is completed, and the collection/storage/cleaning cycle will repeat itself.

Throughout this procedure, any number of operator or mechanical errors can occur. Any one of these errors or combination of errors can cause less than optimal conditions for the storage of raw milk. Less than ideal storage conditions of raw milk will exponentially increase the level of bacterial growth in the stored raw milk causing the quality of the raw milk to decrease and in some cases to be rendered totally un-saleable. While in some cases the sub-optimal raw milk may still be used in certain procedures not requiring optimal quality raw milk, it is becoming the norm that the entire quantity of raw milk which is held in the storage tank be discarded as waste and the revenue to the dairy farmer is thus permanently lost.

The quality of the raw milk in the storage tank will be subjected to several qualitative tests prior to acceptance for processing. The transport truck driver will visually inspect the milk, smell the milk and in some cases taste it. If the transport driver decides the milk is of poor quality, he may refuse to collect the milk and the stored milk will be dumped. Oral subjective testing is an inexact science and tends to put undue pressure on the tester. After passing the oral test, a sample of raw milk is collected for subsequent random laboratory testing for conditions in the raw milk that cannot be detected by the oral qualitative tests. A storage tank of raw milk may pass the qualitative tests on the farm but later be found to have been of poor quality. This will result in a warning being issued, possibly a penalty levied, and depending on recent history, the producers right to ship milk may be suspended until the cause of the infraction is identified and corrected.

To aid in the monitoring and evaluating of stored milk there are currently various makes and models of analog and digital data loggers that can be attached to the storage tank to "log" the ambient temperatures of the storage tank. Some models may also record the temperatures of the milk harvesting cleaning cycles. This information is used as proof of the actual temperatures of the raw milk in the storage tank over the specified period of time between milk pick ups. The operator and the milk transport truck driver or other agent of the regulatory body can then review the conditions of the raw milk in that specified period of time to assist in the qualitative judging of the quality of the raw milk stored in that particular storage tank. Conventional data loggers and some model of storage tanks can also be equipped with audible or visual alarms that will notify the operator of any conditions that are detected to be outside a preset range of temperatures in the storage tank.

Current alarm systems and data loggers, however useful, have many shortfalls. Pre-occupied, un-responsible, or absent operators are common. Data loggers are not routinely checked and faulty storage conditions of the raw milk can go undetected until the transport driver checks the data logger. Faulty storage conditions occurring during the initial harvesting session when not promptly detected, will contaminate subsequent fresh milk introduced for storage. Many regions of the dairy industry are now considering formalizing the data logging activity. In certain jurisdictions, regulatory bodies are testing the reliability of data logging equipment with a view to making it mandatory to have a data logger on the storage tank to record both the temperature of the raw milk in the storage tank between pick ups and the temperatures of the cleaning cycles.

(c) Description of the Prior Art

Among the patent literature relating to the above-referred-to apparatus and methods to monitor the quality of milk are the following:

U.S. Pat. No. 4,455,483, patented Jun. 19, 1984, by M. J. Schönhuber which was directed to a system for recording data relating to specific lots of milk. The data were collected at delivery locations by a collecting vehicle and were brought by the vehicle to a collecting station. The system included a recorder in the vehicle. The recorder included data input means, a controlled unit means and memory means. The system further included a collecting station where data from the vehicle was converted and stored on two different data carriers. The system further included stationary data processing units which received the data from the two different data carrying units in the collecting stations.

U.S. Pat. No. 4,612,537, patented Sep. 16, 1986, by A. Maltairs et al, which was directed to an alarm system for monitoring the temperature of a liquid contained in a reservoir. The system included a temperature sensing probe for sensing the temperature of the liquid. A sensing circuit was associated with the probe to generate a temperature-indicating signal which was representative of the liquid temperature. A calibration circuit was provided for calibrating the temperature signal relative to a reference signal. Converter means was provided to convert the calibrated temperature signal to a binary signal which was indicative of sensed temperatures of the liquid. This fed comparator circuits having pre-set limit detectors to initiate an alarm signal when the temperature signal exceeded a predetermined value. The comparator circuits also fed a display device to indicate the temperature of the liquid.

U.S. Pat. No. 4,710,755, patented Dec. 1, 1987, by R. A. Gurney, which was directed to an alarm for a milk cooler, which sounded an alarm when the temperature of milk within the cooler exceeded a predetermined value. A switch permitted the device to be turned off to prevent it from sounding such alarm when milk was being discharged from the cooler, or when the cooler was being cleaned with hot cleaning solvent. However, when fresh milk was being introduced into the cooler, that switch was overridden and the alarm sounded should the milk not be cooled to the required temperature after a predetermined interval of time.

U.S. Pat. No. 5,743,209, patented Apr. 28, 1998, by S. Bazin et al, which was directed to a system and method for monitoring and controlling milk production at dairy farms. That patent provided an automated modular system, whose operation provided a method for officially controlling the quantity and quality of milk production at a dairy farm site. The method included the first steps of assigning each dairy herd an identification code and also assigning each milk producing animal in each herd a unique animal identification code. The quantitative milk production from an individual animal was measured using a milk flow meter which was temporarily connectable with a milking machine for an individual animal. The milk flow meter was capable of continuously weighing milk produced per unit time by an individual animal during a single milking session. A qualitative analysis of the composition of a sample of milk from an individual dairy animal was provided. Such analysis included an infrared optical probe. A system control and memory was connected to the milk flow meter and to the qualitative analysis. A dairy herd code was entered into the system control and thereby initiated control of the herd and accessing stored data for herd and each individual dairy animal therein. An individual dairy animal identification code was entered in the system control when the corresponding individual dairy animal was present at the milking machine, thereby activating the milk flow meter. Quantitative milk production from the individual dairy animal was measured. A sample of milk from the individual dairy animal was quantitatively analyzed. Completion of milking session as indicated by milk flow meter was detected, and memory data from the milking session was stored in the system.

U.S. Pat. No. 5,996,529, patented Dec. 7, 1999, by K. L. Sisson et al, which was directed to a milk metering and cow I.D. system, for use in a milking parlor having a plurality of stalls. The system monitored milk production and identified each of a plurality of animals being milked. A plurality of milk metering subsystems was included, each of which was assigned to one of a plurality of stalls. The milk metering subsystem sensed the temperature of milk and/or wash flowing through the milk metering subsystem. A host computer managed both the flow of data throughout the system and the operation of the milk metering subsystems by way of a remotely-located system interface between the computer and each of the milk metering subsystems. An RS-485 connection between each of the plurality of milk metering subsystems and system interface was included. The system also included at least one antenna which received animal identification data for each of the animals being milked and electrically communicated that identification data the host computer. A plurality of transponders was included in which one was located on an ear of each monitored animals. A receiver was also provided for each stall. Milk production data was automatically transferred to the host computer after the expiration of a time period following a triggering even, at the end of a shift, or on demand.

U.S. Pat. No. 6,006,615, patented Dec. 28, 1999, by M. J. Uttinger, which was directed to a remote data acquisition system, which included a sensor into a storage device. The sensor was capable of sensing at least one parameter, e.g., the temperature of the material stored in the storage device. The remote data acquisition system also included transmission means associated with the sensor and which was capable of outputting the information sensed by the sensor, or a data storage device to store the information sensed. That patent also provided a method of allocating the type of processing accorded to material collected from a storage device. In carrying out such method, the storage device incorporated at least one sensor which was capable of reading parameters, e.g., temperatures of material held within the storage device. The method included the steps of outputting the information sensed from the sensor to a central processing station, and using the output information to coordinate the type of processing accorded in the material within the storage device.

According to that patentee, while the primary parameter sensed by the sensor was temperature, other parameters, e.g., the acidity of the milk, its density, conductivity, turbidity or perhaps fat content, may be sensed instead of, or in addition to temperature. According to that patentee, one could monitor the electrical network. This was alleged to highlight any inadequate power supplies. Monitoring of voltage/current demands on the dairy hot water system used for cleaning purposes was alleged to provide proof of water temperature. However, because of inherent faults, this monitoring only provides a rough indirect estimate of the temperatures throughout the system.

That patentee alleged that measuring the voltage/current demands to the farm dairy pumping system responsible for movement of milk from producing dairy cow through to the milk vat would provide a measure of the milk flow. However, because of inherent faults, this measuring only provided a rough indirect estimate of the milk flow.

That patentee also suggested monitoring the clean-in-place (CIP) equipment along with its efficiencies. For example, it was suggested by that patentee that water temperature and volumes could be monitored to ensure food hygiene standards were met with the automated CIP system, or with alternative methods used for cleaning milking machinery. However, there was no teaching of any alarm system to report failure of the CIP procedure.

That patentee also suggested that the temperature of the water supplied or used in relation to the refrigeration system be monitored. The patentee thus suggested taking temperature readings of water both entering and exiting the chiller system. However, there was no teaching of any alarm to warn of any inadequacy of the cooling system should the measured temperature of the water be outside the predetermined upper and lower temperatures.

Thus, the above prior art leaves many other problems to be addressed.

As a further development, the dairy industry is studying the use of Hazard and Critical Control Points standards ("HACCP") which are geared to a dairy farm operation and environment. HACCP standards are currently in use at processing plants. Such standards involve the documentation of compliance with raw milk handling, cleaning/sanitation routines [i.e., clean-in-place] and other dairy farm management standards.

(2) SUMMARY OF THE INVENTION (a) Aims of the Invention

Accordingly there is a need for a system that can do more than merely monitor and record cooling and cleaning conditions in the storage tank. Such a system should also be able to detect operator and mechanical errors that can effect the quality of raw milk before the raw milk goes below optimal raw milk quality standards, That system should be able to document the conditions of the raw milk between milk truck pickups for purposes of HACCP-type documentation, to be able to notify the operator through any electronic means available of conditions that are outside the quality thresholds whether the operator is physically at the facility or not, and to be intelligent enough to determine the stage of milk storage and harvesting sessions to apply the correct thresholds of acceptable quality and be able to perform these functions from information from an unlimited number of dairy farms in independent locations at the same time. The system should be tamper proof and be able to work dependably in less than ideal installation conditions It is a first object of the present invention to address the foregoing problems or at least to provide the public with a useful choice.

It is a second object of the present invention to provide a system that will alleviate at least in part the drawbacks of the prior art.

It is a third object of the present invention to provide a system that can be installed on the process equipment, including but not limited to the vacuum pump, the milk pump, the condensing unit, the storage tank and the interconnecting [hot gas return] piping that can provide information about the temperature of the raw milk prior to transfer into storage, temperature in the storage tank, performance and operations of cooling systems, event time stamping, and clean-in-place sessions.

It is a fourth object of the present invention to provide a system whereby this information is transmitted by wire-line or wireless telephony structure so that a central processing location employing software which is tailored for the analyses of data regarding the conditions on a particular farm and determine the appropriate course of action to alert the appropriate producer through telephony or any other electronic means.

It is a fifth object of the present invention to provide a system whereby the information is made available and delivered on a need-to-know basis to regulatory agencies for the purpose of offsite monitoring of milk production facilities.

It is a sixth object of the present invention to provide a system whereby the operator can set certain desired thresholds for which pre-emptive alerts will be sent.

It is a seventh object of the present invention to provide a system that will be able to provide information through sensors and the communicating device of other conditions on the dairy farm that may be required from time to time by the operator.

It is an eighth object of the present invention to provide a system that will be able to control mechanical processes on the dairy farm by way of additional devices that are instructed by the software of the network operations center to perform a certain function.

(b) Statement of the Invention

The present invention provides for an easy-to-install system of sensors and communication devices that will allow operators to detect operating problems before they happen and to present this information in a HACCP-compliant way at a competitive cost.

One embodiment of this invention provides a system comprising sensors, e.g., analog and/or digital sensors, that are installed on equipment on a dairy farm that will report information through a communication device that sends the information over wire-line or wireless telephony to a network operations center that includes software. The software is programmed to interpret that information and then, firstly, to determine whether the dairy farm operator needs to receive an alert or informational message via telephone or any other electronic communications device suggesting that the operator take appropriate action, and secondly, to present alert and sensor information on a customized secure web site that the operator can access to review the information and prepare the compliance reporting for HACCP-type activities.

A second embodiment of this invention provides a milk storage and quality control system. That system includes a milk flow line from a milking station to a milk storage tank. A sensor is provided determining the flow of milk in the milk line. A temperature sensor is provided in the milk flow line. A temperature sensor is also provided in a milk storage tank. An alarm is provided to warn when the temperature of milk in the milk storage tank is outside of upper and lower temperature limits. Means are provided to withdraw milk from the milk storage tank. In this system, the alarm provides an indication of the quality of milk which is stored in the storage tank so that appropriate corrective or other action may manually or automatically be taken with respect to the milk in the milk storage tank.

A third embodiment of this invention provides a first method of monitoring the storage of milk in a milk storage tank. The method includes a first step of continuously monitoring the temperature of milk in the milk storage tank. The next step involves providing an alarm when the temperature of milk in the milk storage tank is less than a preselected minimum temperature or more than a preselected maximum temperature. The final step involves manually or automatically taking appropriate corrective or other action with respect to milk in the milk storage tank in response to the alarm.

A fourth embodiment of this invention provides a system for monitoring at least one parameter of a milk storage facility where milk is stored "on-site" in a dairy facility, and for automatically providing an alarm that such monitored parameter is outside of predefined thresholds. The system includes at least one sensor to monitor at least one parameter, and to generate signals which provide data which is representative of the monitored parameter. That system includes an "on-site" communication device for receiving the data, for comparing the data with the predefined thresholds, for providing an alarm when the data is outside the thresholds. The system also includes an "off-site" network communications center for receiving the signals from the secure web site, the network operations center having resident software which is programmed to process data which is received from the "on-site" communications device, and to generate preselected information signals.

(c) Other Features of the Invention

By a first feature of the first embodiment of this invention, the system is configured to add additional sensors, e.g., analog and/or digital sensors of various types at various locations at the dairy farm operation, to report information from those sensors on an alerting and informational basis, and to present that information on a customized secure web site that the operator can access to review the information and then to prepare the compliance reporting for HACCP-type or other activities.

By a second feature of the first embodiment of this invention, and/or the above feature, the system is configured to have the alarming and reporting conditions of the system set by the operator through a customized secure web site.

By a third feature of the first embodiment of this invention, and/or the above features thereof, the system is configured to instruct various mechanical devices on the dairy farm to perform various functions based on information which is received and interpreted by the software of the network operations center.

By a fourth feature of the first embodiment of this invention, and/or the above features thereof, the system is configured to enable multiple users to review the information which is collected on any number of dairy farms in any number of location through the network operations center By a fifth feature of the first embodiment of this invention, and/or the above features thereof, the software is encoded with a net of business rules whereby that software can continually monitor any number of conditions on any number of dairy farms in any number of locations against a set of site-specific and regulatory thresholds of raw milk quality standards.

By a first feature of the second embodiment of this invention, the milk storage and quality control system includes a refrigeration line to cool the milk storage tank, the refrigeration line including a refrigeration line temperature sensor, an alarm, so that the alarm provides an indication that the temperature in the refrigerant line is higher than a predetermined maximum temperature or lower than a predetermined minimum temperature so that appropriate corrective or other action may manually or automatically be taken with respect to the milk in the milk storage tank.

By a second feature of the second embodiment of this invention, and/or the above features thereof, the milk storage and quality control system also includes a wash pump including a wash control, as well as a valve to disrupt the flow of milk into the milk storage tank prior to allowing entry of wash solution into the milk storage tank, and an alarm to indicate that the temperature of the wash or cleaning solution is outside preselected washing minimum and maximum temperatures, whereby the temperature sensor provides an indication of inadequate cleaning of the milk cleaning tank so that appropriate corrective or other action may manually or automatically be taken with respect to the temperature of the wash or cleaning solution.

By a first feature of the third embodiment of this invention, the method includes the steps of continuously monitoring the temperature of refrigerant for the cooling of milk in the milk storage tank, providing an alarm when the temperature of the refrigerant is less than a preselected minimum cooling temperature or more than a preselected maximum cooling temperature, and manually or automatically taking appropriate corrective or other action.

By a second feature of the third embodiment of this invention, and/or the above feature thereof, the method includes the steps of continuously monitoring the volume of milk entering the milk storage tank, providing an alarm when the volume of milk is less than a predetermined minimum threshold value or more than a predetermined maximum threshold value, and manually or automatically taking appropriate corrective or other action.

By a third feature of the third embodiment of this invention, and/or the above features thereof the method includes the steps of continuously monitoring the temperature of milk in the milk storage tank, providing an alarm when the temperature of the milk is outside predetermined minimum and maximum threshold values, and manually or automatically taking appropriate corrective or other action.

By a fourth feature of the third embodiment of this invention, and/or the above features thereof, the method monitoring the temperature of the hot wash or cleaning solution in the milk storage tank, providing an alarm when the temperature of the hot wash or cleaning solution is less than a predetermined minimum, or more than a predetermined maximum temperature, whereby the alarm provides an indication of the effectiveness of the cleaning of the milk storage tank, and manually or automatically taking appropriate corrective or other action.

By a first feature of the fourth embodiment of this invention, the sensors include at least one of a storage tank temperature sensor, a condensing unit temperature sensor, a storage tank "clean-in-place" sensor, a vacuum pump sensor, a fill pipe sensor, a storage tank agitation sensor, a milk meter sensor and a harvesting equipment "clean-in-place" sensor.

By a second feature of the fourth embodiment of this invention, and/or the above feature, the "on-site" communication device comprises a combined sensor receiver, data logger processor and two-way communicator, for providing signals to at least one of an "on-site" alarm system and an "on-site" display.

By a third feature of the fourth embodiment of this invention, and/or the above features, the software in the "off-site" network communication center is programmed to generate at least one of the following information signals: an alert signal to an "on-site" telephone; an alert signal to an "on-site" alarming device; an alert signal to any other "on-site" electronic communication device; an alert signal to a processor at a regulatory agency; an alert signal to a processor at a milk collection company; and a signal to a recorder to print a hard copy of the data for analysis and compliance reporting.

(d) Generalized Description of the Invention

As described above, by various embodiments of the present invention, a system for monitoring of dairy farm process conditions is disclosed. The system monitors the physical characteristics of various operations on a dairy farm through the use of analog or digital sensors which are strategically located on, or in, piping, storage vessels, and livestock confinement areas. The sensors are connected to an intelligent communication device that in turn relays the information via wire-line or wireless telephony to an "off-site" network operations center that can process the information from an unlimited number of farms in any location. This network operations center includes software for analyzing the information in order to send out alarms for Hazard and Critical Control Points standards ("HACCP"). Data from each location is archived for further review or proof of process control for regulatory purposes available to the customer and regulatory bodies (on a need to know basis) through a secure, customer-specific internet website.

On the dairy farm, (i.e., "on-site" analog or digital sensors are attached to various parts of the equipment used to harvest and store the raw milk including the vacuum pump, the milk pump, the condensing unit, the milk storage tank(s) and the gas lines of the condensing unit. Data reported by each sensor at each of the locations, will initially be processed by an on-site communications device and then by software residing at the network operations center. Processed results will be compared against industry wide and customizable thresholds set for each specific location. Out-of-threshold conditions will generate instant or delayed alerts (based on the urgency and risk of the condition and the thresholds the farmer entered by way of the web site connection to the software of the networks operations center). Alerts may be delivered to farmer-specified telephone numbers, on site alarming devices or any other means of electronic communication. Regardless of the alerts, the information from the sensors is recorded and is made available on a site-specific secure website for purposes of analysis and compliance reporting. The web-site will also present current news and information, information from any other customized sensing information on the farm as well as the opportunity to order supplies or services over the internet for later delivery.

(3) BRIEF DESCRIPTION OF THE FIGURES

In the accompanying drawings.

Figure 1:
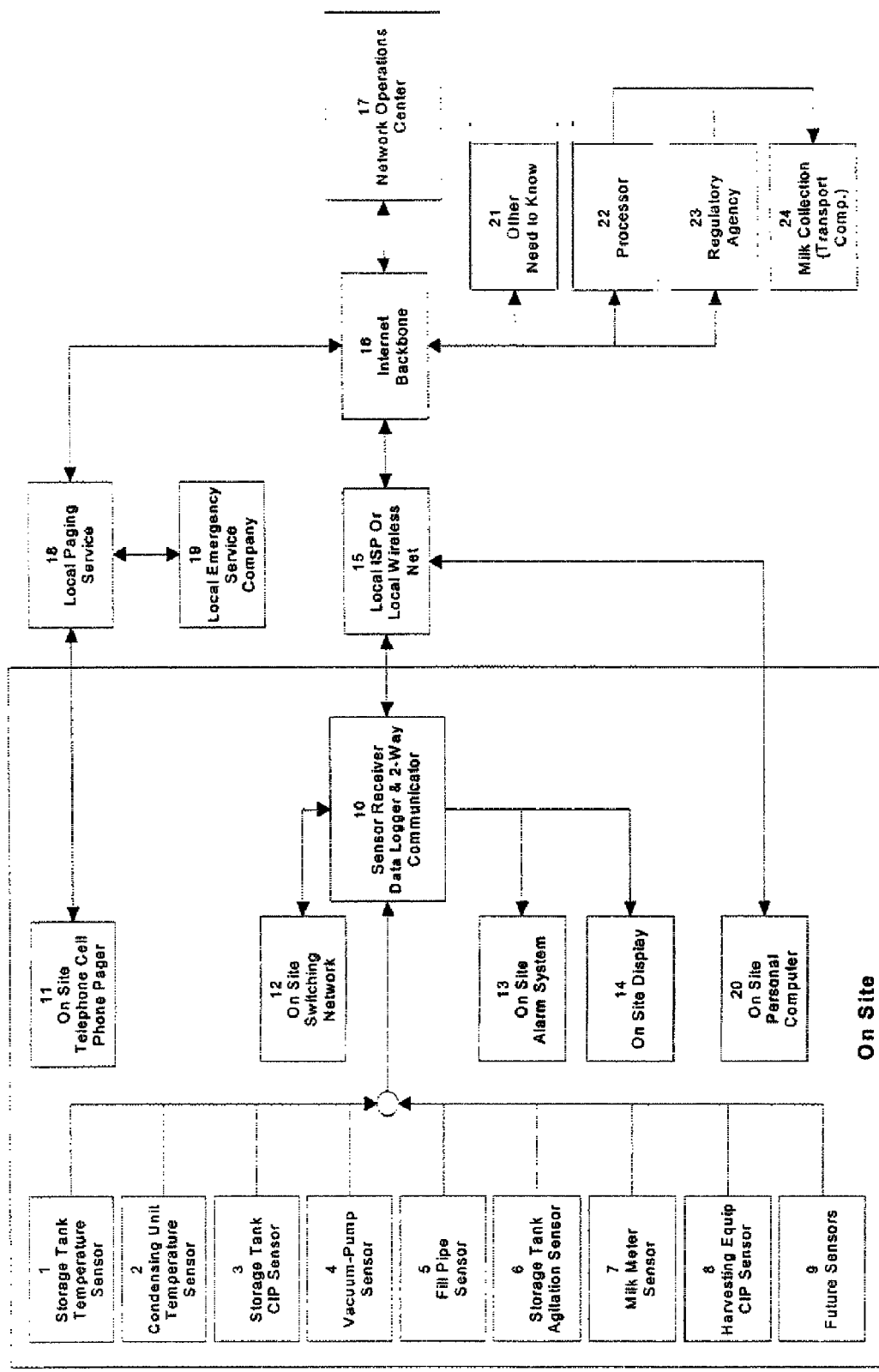
FIG. 1 is a flow chart of a system for the pre-emptive monitoring of dairy production facilities.

(4) DESCRIPTION OF PREFERRED EMBODIMENTS (a) Description of FIG. 1

FIG. 1 depicts the discrete components of one system of an embodiment of this invention and the data flow path of information.

Reference numbers 1 through 9 depict possible sensors which are strategically placed on/in equipment on the farm. The data generated by these sensors is used to monitor the procedures on the farm and are provided "on-site". Thus, reference No. 1 represents the storage tank temperature sensor; reference No. 2 represents the condensing unit temperature sensor; reference No. 3 represents the storage tank clean-in-place sensor; reference No. 4 represents the vacuum pump sensor; reference No. 5 represents the fill pipe sensor; reference No. 6 represents the storage tank agitation sensor; reference No. 7 represents the milk meter sensor; reference No. 8 represents the harvesting equipment clean-in-place sensor; and reference No. 9 represents one or more future sensors.

The data from sensors reference Nos. 1 to 9 are fed to a combined sensor receiver, data logger and two-way communication, (10), which is an electronic device hereafter referred to as the "Communicator".

The communicator (10) provides a two-way communication with an "on-site" switching network (12). The communicator (10) communicates one-way with an "on-site" alarm system (13) and also with an "on-site" display (14), with output connections to any number of display devices. Such display devices include personal computers, CE computing devices, Palm™ platform devices, and printers.

Also "on-site" are a telephone cell phone pager (11) and an "on-site" personal computer (20).

Local internal service provider (hereinafter ISP) or local wireless internet (15) which provides two-way communication with an internet backbone (16) used for the economical instantaneous delivery and distribution of data are provided "off-site". Local ISP (15) provides the "on ramp" onto the internet backbone (16). Local ISP (15) is the device by which out-of-condition alerts can be received, typically by way of a wire-line or cell phone, pager or wireless PIM which is capable of receiving text messaging. Alarms are acknowledged using a customer specific code. The time of acknowledgment is logged and stored as historical data. In addition, local paging service (18) provides two-way communication with local emergency service company (19).

Internet backbone (16) provides two-way communication with a regulatory agency processor (23), a processor (22) and other need-to-know systems (21). Processor (22) provides one-way communication to the milk collection transportation company (24) as well as to the regulatory agency processor (23).

Finally, but importantly, the internet backbone (16) is in two-way communication with the network operation center [hereinafter NOC] (17).

The communicator (10) has capabilities which include: a) gathering information from the sensors; b) transmitting data to the NOC (17); c) receiving and applying logic (received from the NOC (17)) to combinations of data received from the sensors for the purpose of aiding in the detection of imminent emergency situations; d) receiving and routing data to "on-site" switching networks (12); and e) controlling "on-site" alarming devices (13).

The NOC (17) is the control of the network, Data from the communicator (10) is processed by customized software residing in the NOC (17). "On-site" conditions found outside preprogrammed thresholds would generate responses relative to the type of out-of-condition situation. Alerts would be directed via a local paging service (18) to the customer to inform him of the type and severity of the out-of-condition situation. Alerts could also be directed to emergency service companies (19) for the purpose of prompt and efficient response to imminent out-of-condition situations.

Data which is received is converted and may be presented in a graphical manner for dissemination on a password-protected website which is available to the customer.

Converted data may be subdivided for selective analysis on a "need-to-know" basis to regulatory agencies, processors and other companies having interest in the successful operation of the dairy farm.

Data is archived for historical "proof of performance".

The on-site communicator (10) may also be provided with residual individual or industry wide revised threshold conditions and alarm logic.

The NOC (17) can monitor simultaneously any number of farms world-wide, yet provide a personalized site per location. The NOC (17) can also accommodate regionalised custom settings.

Figure 2:
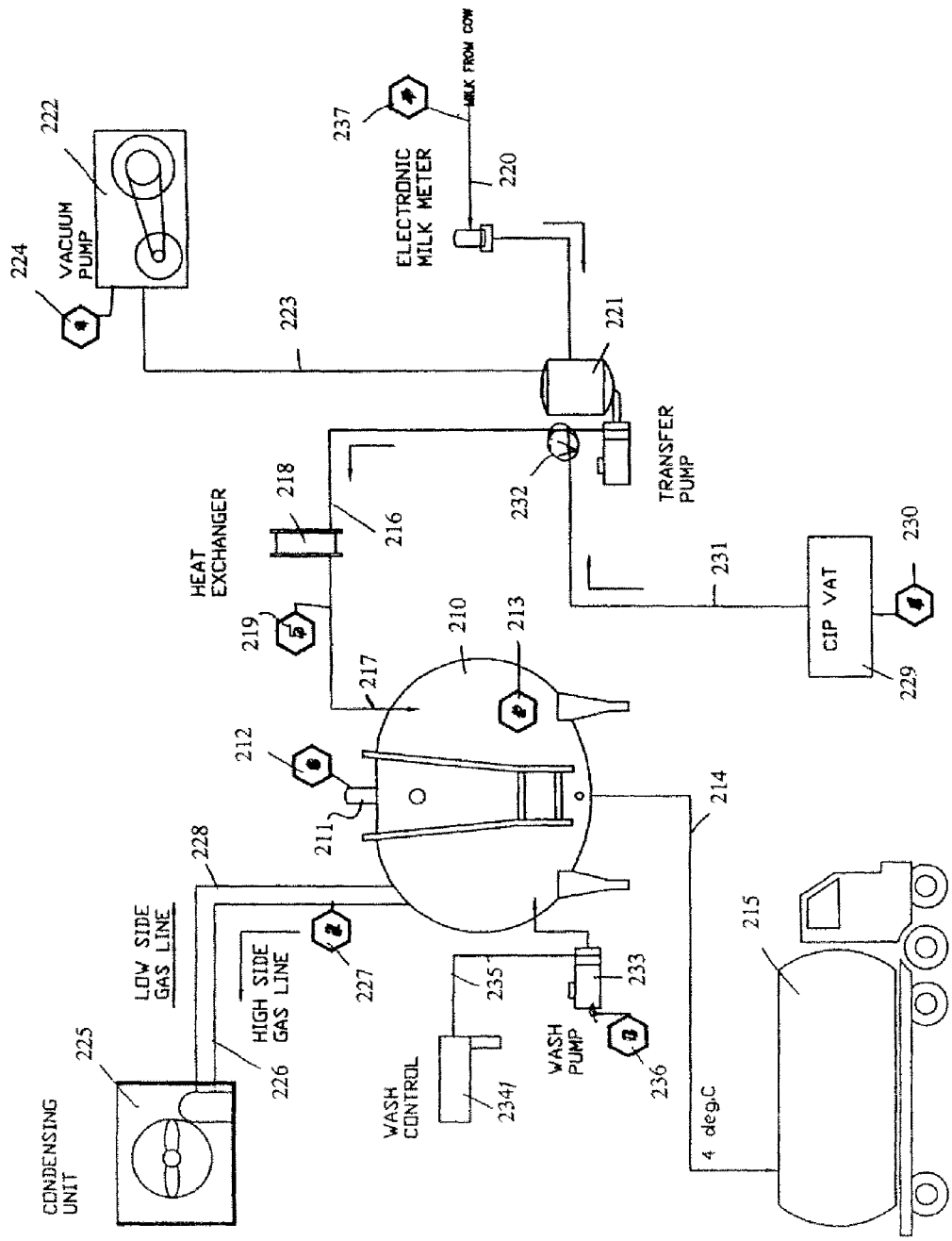
FIG. 2 is a schematic representation of one embodiment of a milk production, storage and milk delivery system.

(b) Description of FIG. 2

FIG. 2 of the drawings shows a milk storage tank (210). Within milk storage tank (210) is an agitator (211) for milk which is stored in the milk storage tank (210). Agitator (211) is provided with a sensor (212) to monitor the operation of the agitator (211). Also within the milk storage tank (210) is a storage tank temperature sensor (213).

Milk storage tank (210) is further provided with a milk withdrawal line (214), leading to a milk tank (215).

Milk storage tank (210) is also provided with an incoming milk transfer line (216) which leads, via fill pipe (217), to the milk storage tank (210). Milk transfer line (216) is provided with a heat exchanger (218) to control the temperature of milk in the milk transfer line (216), and with a milk transfer line temperature/flow sensor (219). Milk from a milking station (not seen) flows in a milk flow line (220) to a transfer pump (221). The milk flow line (220) is equipped with a milk meter volume sensor (222).

Transfer pump (221) is used to transfer raw milk from the milk harvesting equipment to the milk storage tank (210).

Milk in the milk storage tank (210) is cooled by means of a condensing unit (225). The high side gas line (226) of the condenser unit (223) is provided with a refrigerant line temperature sensor (224). The condensing unit (225) also includes a low side gas line (228).

In order to clean the milk storage tank (210) after each load has been discharged therefrom, a clean-in-place (hereinafter CIP) system is provided. The CIP system includes a CIP vat (229) which is provided with a harvesting equipment CIP sensor (230) and is connected to the transfer pump (221) via wash or cleaning solution line (231). A valve (232) is provided at the intersection of lines (231) and (216). Valve (232) controls the unique flow of wash or cleaning solution from line (231) to line (216), or the unique flow of milk from line (220) to line (216).

This system also includes a wash or cleaning solution pump (233) and a wash or cleaning solution control (234) connected thereto by control line (238). The wash or cleaning solution pump is equipped with a wash pump operation sensor (236)

(c) Operation of the System

In operation, milk from the milk flow line is metered and pumped into the milk storage tank after having passed through a heat exchanger to reduce its temperature to an industry-standard raw milk storage temperature.

The temperature of the milk in the milk storage tank after every milking cycle is continuously monitored. If the temperature is less than 36° F., an alarm is triggered to warn of freezing, and manually or automatically to institute corrective or other action. In addition, the refrigerant line temperature sensor alarm may be triggered to indicate that the excess cooling might be due to a fault in the condensing unit, and manually or automatically to institute corrective or other action. If the temperature of milk in the milk storage tank exceeds 40° F. there is a possibility of spoilage of the milk or a degradation of its quality for some future processing. The storage tank temperature sensor is triggered so that appropriate corrective or other action may manually or automatically be taken, either to check the operation of the heat exchanger and/or the operation of the condensing unit and/or the operation of the storage tank agitator.

(5) CONCLUSION

As a consequence of the installation of the system of embodiments of this invention, a complete management structure is implemented with live data being accessed by users of the system.

Total quality management is supported through the system. The live data accessed can be referenced to the producing dairy farm permitting the farmer and processing dairy factory to have complete analysis on quality and quantity of milk produced together the efficiencies of processing farm dairy equipment including milk storage tanks, milk silos or other holding vessels and the corresponding refrigeration/chiller systems. It also allows operators to take corrective action before the quality of the raw milk decreases.

Milk collection service completed by the dairy company milk tankers and private contractors may be aided by the availability of live data from the producing dairy farms.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What is claimed is:

1. A post-harvest milk quality monitoring and warning system for a dairy farm comprising:
    a set of sensors located throughout the dairy farm for obtaining measurements relating to milk delivery and milk quality parameters post-harvest, the set of sensors including at least one milk transfer line flow sensor located in a milk transfer line; and
    a networks operations system for receiving the measurements from the set of sensors and determining post-harvest milk quality trends based on the measurements and for transmitting warning or alarm messages to predetermined parties based on suspected problems arising from the determined post-harvest milk quality trends to allow correction to be enabled.

2. The monitoring and warning system of claim 1 wherein the post-harvest milk quality trends are determined by comparing the measurements with industry or predetermined thresholds on a continuous basis to determine out of threshold readings so that the warning message can be transmitted to allow for the pre-emptive correction.

3. The monitoring and warning system of claim 1 wherein the predetermined parties include an owner of the dairy farm, an emergency service individual or an auditing regulatory agency.

4. The monitoring and warning system of claim 1 further comprising a communicator for transmitting the information from the sensors to the networks operations system and for transmitting the alert messages based on instructions received from the networks operations system.

5. The monitoring and warning system of claim 4 wherein said communicator transmits said measurements to a designated recipient.

6. The monitoring and warning system of claim 5 wherein said measurements are presented in a graphical manner.

7. The monitoring and warning system of claim 6 wherein said measurements are displayed on a password-protected website.

8. The monitoring and warning system of claim 5 wherein said designated recipient is selected from the group consisting of an on site switching network, an on site alarm system; an on site display; a personal computer; a telephone cellphone pager, a server, an emergency service company, a paging service, a network operations centre and a processor.

9. The monitoring and warning system of claim 1 wherein said set of sensors are selected from a group consisting of a storage tank temperature sensor, a condensing unit temperature sensor, a storage tank clean-in-place sensor, a vacuum-pump sensor, a fill pipe sensor, a storage tank agitation sensor, a milk meter sensor and a harvesting equipment clean-in-place sensor.

10. The monitoring and warning system of claim 1 further comprising an interface allowing a user to access said system remotely.

11. The monitoring and warning system of claim 10 wherein said interface includes a processor to receive instructions from said user to change said designated recipient.

12. The monitoring and warning system of claim 10 wherein said interface further comprises a display for displaying said measurements.

* * * * *